US012686802B2

(12) United States Patent　　　(10) Patent No.: US 12,686,802 B2
Otsuka et al.　　　　　　　　　(45) Date of Patent: *\*Jul. 21, 2026*

---

(54) COMPOSITE MATERIAL

(71) Applicant: NITTO DENKO CORPORATION,
Ibaraki (JP)

(72) Inventors: Tetsuya Otsuka, Ibaraki (JP);
Takanobu Mimura, Ibaraki (JP);
Tomoya Kato, Ibaraki (JP)

(73) Assignee: NITTO DENKO CORPORATION,
Ibaraki (JP)

( * ) Notice: Subject to any disclaimer, the term of this
patent is extended or adjusted under 35
U.S.C. 154(b) by 821 days.

This patent is subject to a terminal dis-
claimer.

(21) Appl. No.: 17/915,574

(22) PCT Filed: Mar. 30, 2021

(86) PCT No.: PCT/JP2021/013738
§ 371 (c)(1),
(2) Date: Sep. 29, 2022

(87) PCT Pub. No.: WO2021/201063
PCT Pub. Date: Oct. 7, 2021

(65) Prior Publication Data

US 2023/0159811 A1　　May 25, 2023

(30) Foreign Application Priority Data

Mar. 31, 2020　(JP) ................................. 2020-064902

(51) Int. Cl.
*C09K 5/14* (2006.01)
*C08J 9/00* (2006.01)
(Continued)

(52) U.S. Cl.
CPC ............... *C09K 5/14* (2013.01); *C08J 9/0066*
(2013.01); *C08J 9/26* (2013.01); *C08K 3/38*
(2013.01);
(Continued)

(58) Field of Classification Search
CPC ............... C09K 5/14; C08K 2003/385; C08K
2201/001; C08K 2201/005;
(Continued)

(56) References Cited

U.S. PATENT DOCUMENTS

2003/0038278 A1　2/2003　Ishihara
2009/0169863 A1　7/2009　Luo
(Continued)

FOREIGN PATENT DOCUMENTS

CN　　107722157 A　　2/2018
CN　　115210308 A　　10/2022
(Continued)

OTHER PUBLICATIONS

Office Action issued on Sep. 15, 2024 for corresponding Chinese
Patent Application No. 202180018157.5, along with an English
translation (16 pages).
(Continued)

*Primary Examiner* — Jane L Stanley
(74) *Attorney, Agent, or Firm* — HAUPTMAN HAM,
LLP

(57) ABSTRACT

A composite material according to the present invention
includes a solid portion including inorganic particles and a
resin. The composite material has a porous structure includ-
ing a plurality of voids surrounded by the solid portion. The
composite material compressed by 10% has a reaction force
of 0.1 kPa to 1000 kPa, and the composite material has a heat
conductivity of 0.5 W/(m·K) or more. The heat conductivity
is a value measured for one test specimen in a symmetric
(Continued)

configuration according to an American Society for Testing and Materials (ASTM) standard (ASTM) D5470-01.

19 Claims, 4 Drawing Sheets

(51) Int. Cl.

| | |
|---|---|
| *C08J 9/26* | (2006.01) |
| *C08K 3/38* | (2006.01) |
| *C08L 67/06* | (2006.01) |
| *C08L 83/04* | (2006.01) |

(52) U.S. Cl.
CPC .............. *C08L 67/06* (2013.01); *C08L 83/04* (2013.01); *C08J 2201/046* (2013.01); *C08J 2205/044* (2013.01); *C08J 2367/06* (2013.01); *C08J 2383/04* (2013.01); *C08K 2003/385* (2013.01); *C08K 2201/001* (2013.01); *C08K 2201/005* (2013.01); *C08K 2201/016* (2013.01); *C08L 2203/14* (2013.01)

(58) Field of Classification Search
CPC .......... C08K 2201/016; C08J 2201/046; C08J 2205/044; C08J 2367/06; C08J 2383/04; C08L 2230/14
See application file for complete search history.

(56) References Cited

U.S. PATENT DOCUMENTS

| | | | |
|---|---|---|---|
| 2013/0012621 A1 | 1/2013 | Yamamoto et al. | |
| 2014/0087614 A1 | 3/2014 | Matsuda et al. | |
| 2015/0348669 A1* | 12/2015 | Adamson ................. | C08J 9/365 |
| | | | 252/511 |
| 2015/0359134 A1* | 12/2015 | Soong .................. | H05K 1/0203 |
| | | | 361/720 |
| 2016/0053069 A1* | 2/2016 | Gotoh ................... | H10F 19/804 |
| | | | 428/313.5 |
| 2018/0094180 A1 | 4/2018 | Prebe et al. | |
| 2018/0178421 A1 | 6/2018 | Nakanishi | |
| 2019/0225754 A1 | 7/2019 | Nukada et al. | |
| 2020/0005754 A1 | 1/2020 | Ito et al. | |
| 2021/0139761 A1 | 5/2021 | Kawahara et al. | |
| 2023/0131295 A1 | 4/2023 | Otsuka et al. | |
| 2023/0159811 A1 | 5/2023 | Otsuka et al. | |

FOREIGN PATENT DOCUMENTS

| | | |
|---|---|---|
| CN | 115244117 A | 10/2022 |
| EP | 3 283 594 B1 | 11/2019 |
| JP | 2001-59039 A | 3/2001 |
| JP | 2003-60134 A | 2/2003 |
| JP | 2007-320988 A | 12/2007 |
| JP | 2009-191171 A | 8/2009 |
| JP | 2010-144152 A | 7/2010 |
| JP | 2011-176024 A | 9/2011 |
| JP | 2012-153774 A | 8/2012 |
| JP | 2013-14716 A | 1/2013 |
| JP | 2013-136658 A | 7/2013 |
| JP | 2015-105282 A | 6/2015 |
| JP | 2016-71108 A | 5/2016 |
| JP | 2018/075765 A1 | 4/2018 |
| JP | 2018-512493 A | 5/2018 |
| JP | 2018-109101 A | 7/2018 |
| JP | 2019-44130 A | 3/2019 |
| JP | 2019-127535 A | 8/2019 |
| JP | 2019-131760 A | 8/2019 |
| JP | 2019-533049 A | 11/2019 |
| TW | 201249906 A1 | 12/2012 |
| TW | 201437263 A | 10/2014 |
| TW | 201904765 A | 2/2019 |
| WO | 2019/131622 A1 | 7/2019 |

OTHER PUBLICATIONS

Office Action issued on Jan. 22, 2024 for corresponding Chinese Patent Application No. 202180018157.5, along with an English machine translation (12 pages).
The Extended European Search Report issued on Mar. 7, 2024 for corresponding European Patent Application No. 21781206.4 (8 pages).
Office Action issued on Jan. 24, 2025 for corresponding Chinese Patent Application No. 202180018157.5, along with an English translation (11 pages).
International Search Report issued on Jun. 22, 2021, in connection with International Patent Application No. PCT/JP2021/013738, 6 pages, along with English translation.
Written Opinion issued on Jun. 22, 2021, in connection with International Patent Application No. PCT/JP2021/013738, 12 pages, along with English translation.
Office Action dated Mar. 18, 2025 for corresponding European Patent Application No. 21 781 206.4 (4 pages).
Office Action issued on Mar. 27, 2025 for corresponding Chinese Patent Application No. 202180018157.5, along with an English translation (11 pages).
Taiwan Office Action issued on Aug. 14, 2024, in connection with the Taiwan Patent Application No. 110111955, with its English translation, 18 pages.
International Search Report issued on Jun. 29, 2021, in connection with International Patent Application No. PCT/JP2021/013737 (4 pages), along with English translation.
Written Opinion issued on Jun. 29, 2021, in connection with International Patent Application No. PCT/JP2021/013737 (8 pages), along with English translation.
The Extended European Search Report dated Mar. 7, 2024 for corresponding European Patent Application No. 21779624.2 (8 pages).
Office Action issued on Feb. 29, 2024 for corresponding Chinese Patent Application No. 202180018138.2, along with an English machine translation (12 pages).
Xiaohu et al., "Science and Technology of Superhard Material", Synthetic Diamond, cBN and Product Series, vol. 1, Chapter 14, China Building Materials Industry Press, Apr. 1998, p. 325, along with an English translation (6 pages).
Zhang et al., "User Manual for Thermosetting Resin-Based Composite Prepregs", China Building Materials Industry Press, Jun. 2019, p. 43, along with an English translation (8 pages).
Office Action issued on May 14, 2024, for corresponding Chinese Patent Application No. 202180018138.2, along with an English machine translation (13 pages).
Office Action issued on Jul. 3, 2024 for corresponding Taiwanese Patent Application No. 110111958, along with an English translation (18 pages).
Office Action dated Jan. 29, 2025 for corresponding European Patent Application No. 21 779 624.2 (6 pages).
International Search Report issued on Jun. 22, 2021, in connection with International Patent Application No. PCT/JP2021/013740, 4 pages, along with English translation.
Written Opinion issued on Jun. 22, 2021, in connection with International Patent Application No. PCT/JP2021/013740, 7 pages, along with English translation.
Extended European Search Report dated Mar. 15, 2024 in connection with the counterpart European Patent Application No. EP21780374. 1, 5 pages.
Office Action dated Oct. 10, 2024 for corresponding Chinese Patent Application No. 202180019242.3, along with an English machine translation (12 pages).
Office Action dated Dec. 21, 2024 for corresponding Chinese Patent Application No. 202180019242.3, along with an English translation (13 pages).
Office Action issued on Mar. 12, 2025 for corresponding Chinese Patent Application No. 202180019242.3, along with an English translation (14 pages).

(56)　　　　References Cited

OTHER PUBLICATIONS

International Search Report issued Jun. 22, 2021, corresponding to International Patent Application No. PCT/JP2021/013739, 6 pages, along with English Translation.
Written Opinion issued Jun. 22, 2021, corresponding to International Patent Application No. PCT/JP2021/013739, 10 pages, along with English Translation.
The Extended European Search Report issued on Mar. 11, 2024 for corresponding European Patent Application No. 21782005.9 (8 pages).
Office Action issued on Aug. 31, 2024 for corresponding Chinese Patent Application No. 202180018154.1 along with an English translation (11 pages).
Office Action issued on Sep. 26, 2024 for corresponding Taiwanese Patent Application No. 110111954 along with an English translation (19 pages).

Communication pursuant to Article 94(3) EPC issued on Jan. 27, 2025 for corresponding European Patent Application No. 21 782 005.9 (6 pages).
Office Action issued on Jan. 7, 2025 for corresponding Chinese Patent Application No. 202180018154.1, along with an English translation (10 pages).
International Search Report issued Jun. 22, 2021, corresponding to International Patent Application No. PCT/JP2021/013741, 4 pages, along with English Translation.
Written Opinion issued Jun. 22, 2021, corresponding to International Patent Application No. PCT/JP2021/013741, 7 pages, along with English Translation.
The Extended European Search Report dated Mar. 15, 2024 for corresponding European Patent Application No. 21781986.1, (5 pages).

\* cited by examiner

COMPOSITE MATERIAL

CROSS REFERENCE TO RELATED APPLICATION

This application is a National Stage of International Application No. PCT/JP2021/013738, filed on Mar. 30, 2021, which designates the United States and was published in Japan, and which is based upon and claims priority to Japanese Patent Application No. 2020-064902, filed on Mar. 31, 2020 in the Japan Patent Office. All of the aforementioned applications are hereby incorporated herein by reference in their entireties.

TECHNICAL FIELD

The present invention relates to a composite material.

BACKGROUND ART

Efforts have been made to increase the heat conductivity of materials, such as foam materials, having a plurality of voids.

For example, Patent Literature 1 discloses a composite material including: scaly fillers formed of an inorganic material; and a binding resin formed of a thermosetting resin binding the fillers. This composite material is a foam material in which a plurality of voids are dispersed, and the fillers accumulate on inner walls of the voids such that flat surfaces of the fillers overlap each other (claim 1 and FIG. 1). According to Patent Literature 1, the flat surfaces of the fillers are less likely to overlap each other when a ratio, namely, an aspect ratio, of an average length of the flat surfaces of the fillers to a thickness of the filler is less than 50.

A composite material including an inorganic filler but having excellent thermal insulation properties was also proposed. Patent Literature 2 discloses a polyurethane foam obtained from a composition including a polyol, a blowing agent, a layered clay mineral, etc. This composite material has a high closed cell rate, and the layered clay mineral which is an inorganic filler is uniformly dispersed therein.

CITATION LIST

Patent Literature

Patent Literature 1: JP 2018-109101 A

Patent Literature 2: JP 2009-191171 A

SUMMARY OF INVENTION

Technical Problem

Commonly, as the amount of inorganic particles included as a filler in a composite material is increased to improve the heat conductivity, the effect of the inorganic particles on properties other than heat conductivity becomes greater. The present invention aims to provide a new composite material for which this tendency is mitigated.

Solution to Problem

The present invention provides a composite material including a solid portion including inorganic particles and a resin, wherein the composite material has a porous structure including a plurality of voids surrounded by the solid portion, the composite material compressed by 10% has a reaction force of 0.1 kPa to 1000 kPa, and the composite material has a heat conductivity of 0.5 W/(m·K) or more, where the heat conductivity is a value measured for one test specimen in a symmetric configuration according to an American Society for Testing and Materials (ASTM) standard D5470-01.

In another aspect, the present invention provides a composite material including a solid portion including inorganic particles and a resin, wherein the composite material has a porous structure including a plurality of voids surrounded by the solid portion, the composite material has a compressive elastic modulus of 100 kPa to 600 kPa, and the composite material has a heat conductivity of 0.5 W/(m·K) or more, where the heat conductivity is a value measured for one test specimen in a symmetric configuration according to an American Society for Testing and Materials (ASTM) standard (ASTM) D5470-01.

Advantageous Effects of Invention

The present invention can provide a composite material easily changing its shape in response to a compressive force even when including the inorganic particles such that the heat conductivity is 0.5 W/(m·K) or more.

DESCRIPTION OF EMBODIMENTS

Embodiments of the present invention will be described hereinafter with reference to the drawings. The following description describes examples of the present invention, and the present invention is not limited to the following embodiments.

Figure 1:
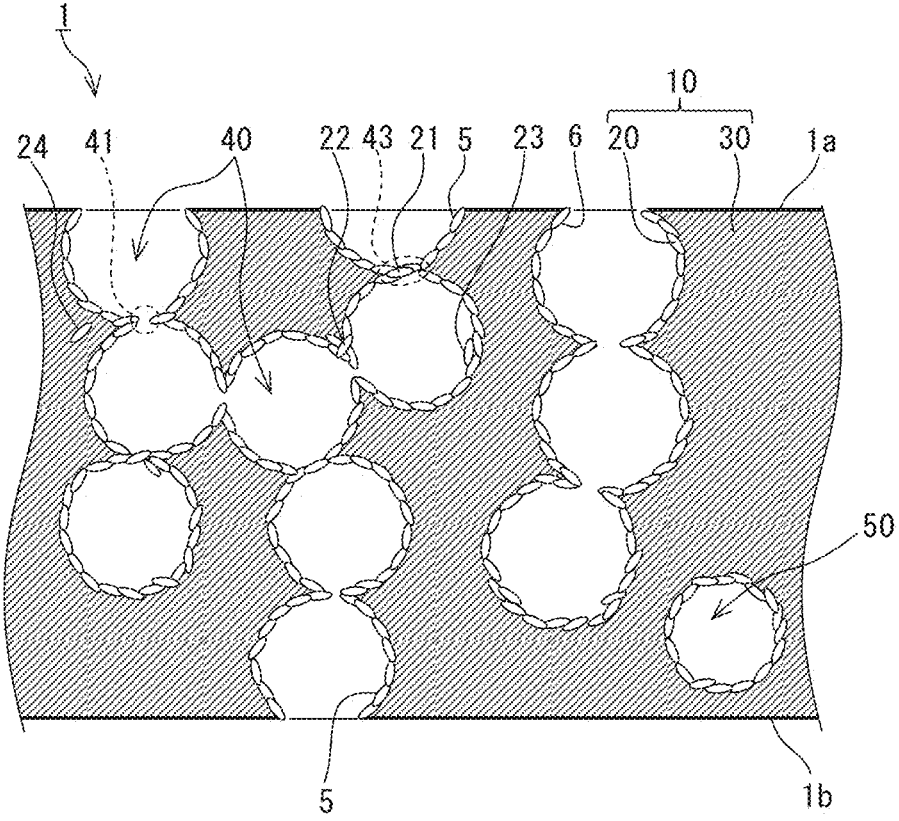
FIG. 1 is a cross-sectional view schematically showing an example of a composite material according to the present embodiment.

As shown in FIG. 1, a composite material 1 according to the present embodiment includes a solid portion 10. The solid portion 10 includes inorganic particles 20 and a resin 30. For example, the composite material 1 has a porous structure including a plurality of voids 40 in contact with each other via the inorganic particle 20 or directly without the inorganic particle 20. For example, at least a portion of the inorganic particles 20 is present on a wall surface of the solid portion 10, the wall surface facing the void 40. Heat transmission paths 5 and 6 stretch, for example, through the plurality of voids 40, that is, along the plurality of voids 40. The heat transmission paths 5 and 6 are formed of the plurality of inorganic particles 20 arranged continuously, i.e., in contact with each other or close to each other. The heat transmission paths 5 and 6 stretch, for example, without extending through the inside of the solid portion 10, more specifically, along the wall surface of the solid portion 10. For example, some of the heat transmission paths 5 stretch from a surface 1a of the composite material 1 to a surface 1b on the opposite side thereof.

The composite material 1 compressed by 10% has a reaction force of 0.1 kPa to 1000 kPa. The reaction force of the composite material compressed by 10% may be 0.5 kPa to 950 kPa or 1 kPa to 900 kPa. The reaction force of the composite particles 1 compressed by 10% can be determined, for example, according to JIS K 7181: 2011 or JIS K 7220: 2006. The reaction force of the composite particles 1 compressed by 10% can be measured, for example, using RSA-G2 manufactured by TA Instruments Japan Inc.

The composite material 1 has a compressive elastic modulus of 100 kPa to 600 kPa. The compressive elastic modulus can be determined, for example, by using an apparatus for dynamic viscoelastic measurement (DMA). The compressive elastic modulus of the composite material 1 can be calculated, for example, from stress values of the composite material 1 and strain values of the composite material 1. The stress values and the strain values are obtained for every 0.2% compression by compressing a 25 mm$^2$ principal surface of the composite material 1 having a thickness of 4 mm by 0% to 5% at a compression rate of 0.01 mm/s. The method for calculating the compressive elastic modulus of the composite material 1 is described in EXAMPLES.

The compressive elastic modulus may be 200 kPa to 580 kPa or 250 kPa to 570 kPa. The upper limit of the compressive elastic modulus may be, in some cases, 550 kPa.

The composite material 1 can exhibit a high heat conductivity. The composite material 1 has a heat conductivity of, for example, 0.5 W/(m·K) or more. The heat conductivity of the composite material 1 can be preferably 0.55 W/(m·K) or more, more preferably 0.6 W/(m·K) or more, and, in some cases, 0.7 W/(m·K) or more. The upper limit of the heat conductivity is not limited to a particular value. The upper limit of the heat conductivity may be, for example, 2.2 W/(m·K), 2.1 W/(m·K), or 2.0 W/(m·K). The heat conductivity of the composite material 1 is, for example, a value measured for one test specimen in a symmetric configuration according to an American Society for Testing and Materials (ASTM) standard (ASTM) D5470-01.

The composite material 1 has, for example, an Asker C hardness of 10 to 50. In this case, the composite material 1 can have an appropriate stiffness to be a composite material that more easily changes its shape. The Asker C hardness is, for example, a value measured according to Japanese Industrial Standards (JIS) K 7312: 1996. The Asker C hardness may be 15 to 47 or 18 to 45.

To form, as in the technique described in Patent Literature 1, a heat transmission path via a route including voids spaced from each other, inorganic particles need to connect outer surfaces of the voids spaced from each other in the solid portion 10. Therefore, the aspect ratio of the inorganic particle needs to be set high. On the other hand, according to the embodiment shown in FIG. 1, even when the aspect ratio of the inorganic particle 20 is not high, the heat transmission paths 5 and 6 are formed and the composite material 1 can exhibit high heat conduction performance.

The composite material 1 does not need to include the inorganic particle 20 by which the voids 40 adjacent to each other are connected and which is, between the voids 40 adjacent to each other, surrounded by the solid portion 10.

It should be noted that all heat transmission paths not necessarily appear in a particular cross-section as shown in FIG. 1 and that all portions of a particular heat transmission path not necessarily appear in a particular cross-section as shown in FIG. 1. For example, in FIG. 1, the heat transmission path 6 does not seem to stretch to the surface 1b. Actually, however, the heat transmission path 6 stretches via the inorganic particles not appearing in this cross-section and reaches the surface 1b. Similarly, it is impossible to confirm in a particular cross-section that every void is in contact with another void. For example, a void 50 seems to be isolated in FIG. 1. Actually, however, the void 50 is in contact with another void adjacent thereto in a thickness direction of the page.

However, not all heat transmission paths need to stretch from the surface 1a to the surface 1b. Moreover, not every void included in the porous structure needs to be in contact with another void directly or via the inorganic particle.

The resin 30 is not present at connecting portions 41 and 43. The resin 30 and the inorganic particle 20 are not present at the connecting portion 41. The voids 40 directly in contact with each other at the connecting portion 41 communicate to each other to form one space. The voids 40 in contact with each other at the connecting portion 43 at which inorganic particles 21 are present may communicate to each other via a small gap between the inorganic particles 21 to form one space or may be present as spaces separated from each other. However, the voids 40 that seem to be in contact with each other via the inorganic particle 21 in FIG. 1 may be directly in contact with and communicate to each other in a cross-section different from the one in FIG. 1.

Figure 2:
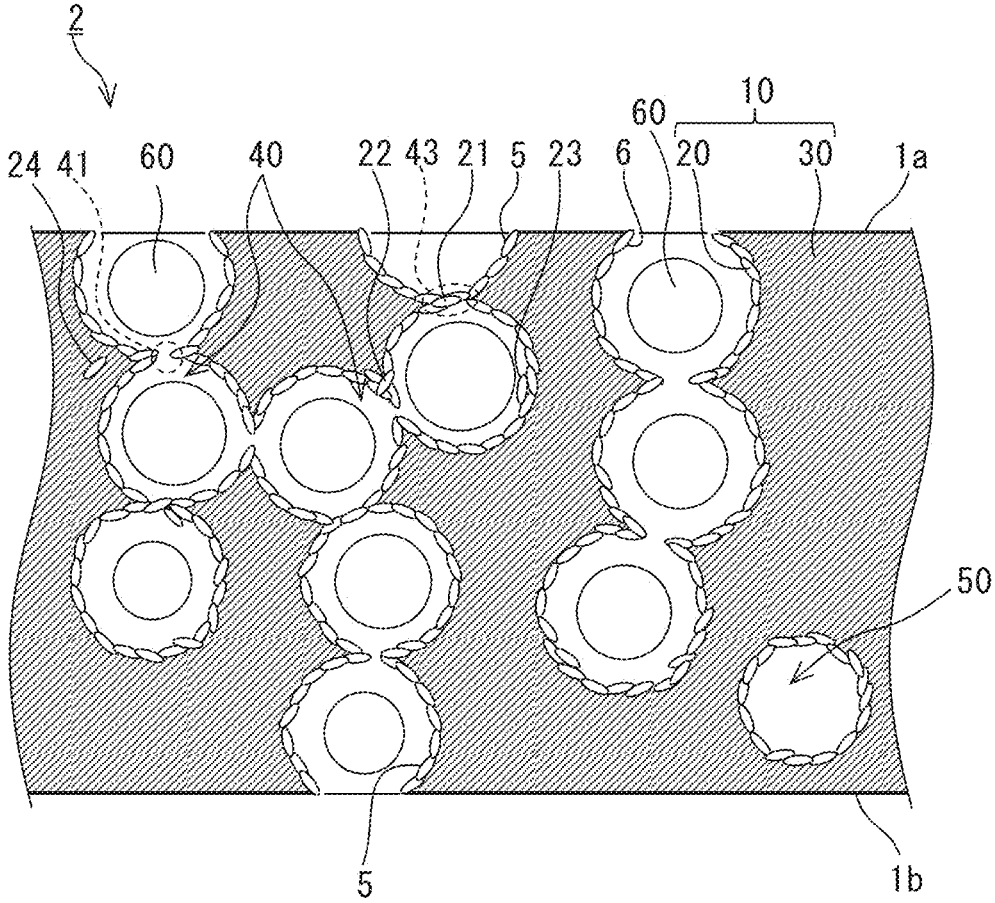
FIG. 2 is a cross-sectional view schematically showing another example of the composite material according to the present embodiment.

As shown in FIG. 2, a particle 60 may be present inside the void 40. The particle 60 is typically a resin particle. The resin particle may be a later-described first resin. The particle 60 can be the first resin shrunk by a heat treatment. The resin particle before shrinking may be in a shape corresponding to the void 40. The resin occupying the void may be removed as shown in FIG. 1, or may deform and remain as shown in FIG. 2. In the latter case, the particle 60 may be in contact with the inorganic particle 20. In a particular cross-section, presence of the particle 60 cannot be confirmed inside of the void 50; however, in another cross-section, presence of the particle 60 may be confirmed inside the same void 50. In the embodiment shown in FIG. 2, the particle 60 is present in at least some of the voids 40 and 50, the particle 60 being smaller than the at least some of the voids 40 and 50.

The inorganic particles 20 around the void 40 may be exposed to the void 40 or does not need to be exposed to the void 40. A surface layer including no inorganic particles 20 may be present between the wall surface of the void 40 and the inorganic particles 20 that are present continuously along the periphery of the void 40, i.e., in contact with each other or close to each other.

The material of the inorganic particle 20 is not limited to a particular material as long as, for example, the inorganic particle 20 has a higher heat conductivity than the heat conductivity of the resin 30. Examples of the material of the inorganic particle 20 include hexagonal boron nitride (h-BN), alumina, crystalline silica, amorphous silica, aluminum nitride, magnesium oxide, carbon fibers, silver, copper, aluminum, silicon carbide, graphite, zinc oxide, silicon nitride, silicon carbide, cubic boron nitride (c-BN), beryllia, and diamond. The shape of the inorganic particle 20 is not limited to a particular shape. Examples of the shape of the inorganic particle 20 include sphere-like, rod-like (including short-fiber), scaly, and granular shapes. The "granular" shape refers to, for example, the shape of the plurality of inorganic particles 20 aggregated using a binder or a sintered body of the plurality of inorganic particles 20.

The aspect ratio of the inorganic particle 20 is not limited to a particular value. The aspect ratio of the inorganic particle 20 may be less than 50, 40 or less, or even 30 or less. The aspect ratio of the inorganic particle 20 may be 1 or more, or may be a greater value, e.g., 2 or more or even 3 or more. The aspect ratio is defined as a ratio (maximum diameter/minimum diameter) of a maximum diameter of the particle to a minimum diameter of the particle, unless otherwise specified. Herein, the minimum diameter is defined as a shortest line segment passing through a mid-point of a line segment defined as the maximum diameter.

The average particle diameter of the inorganic particles 20 is not limited to a particular value. The average particle diameter of the inorganic particles 20 is, for example, 0.05 $\mu$m to 100 $\mu$m, and may be 0.1 $\mu$m to 50 $\mu$m, 0.1 $\mu$m to 30 $\mu$m, or 0.5 to 10 $\mu$m. The average particle diameter can be determined, for example, by laser diffraction-scattering. The average particle diameter is, for example, a 50% cumulative value (median diameter) $d_{50}$ determined from a particle size distribution curve, in which a frequency is represented by a volume-based fraction, obtained using a particle size distribution analyzer (Microtrac MT3300EXII) manufactured by MicrotracBEL Corp.

The shape of the inorganic particle 20 can be determined, for example, by observation using, for example, a scanning electron microscope (SEM). For example, the inorganic particle 20 is considered to have a sphere-like shape when the aspect ratio (maximum diameter/minimum diameter) thereof is 1.0 or more and less than 1.7, particularly 1.0 or more and 1.5 or less, or even 1.0 or more and 1.3 or less and at least a portion of an outline of the inorganic particle 20 observed, particularly, substantially the entire outline of the inorganic particle 20 observed, is a curve.

The "scaly" shape refers to the shape of a plate having a pair of principal surfaces and a lateral surface. The term "principal surface" of the inorganic particle 20 refers to a face thereof having the largest area, and is typically a substantially flat face. When the inorganic particle 20 has a scaly shape, the aspect ratio is defined as a ratio of an average dimension of the principal surfaces to the average thickness, instead of the above definition. The thickness of the scaly inorganic particle 20 refers to the distance between the pair of principal surfaces. The average thickness can be determined by measuring thicknesses of any 50 inorganic particles 20 using a SEM and calculating the average of the thicknesses. A value of $d_{50}$ measured using the above particle size distribution analyzer can be used as the average dimension of the principal surfaces. The aspect ratio of the scaly inorganic particle 20 may be 1.5 or more, 1.7 or more, or even 5 or more.

Examples of the rod-like shape include stick-like shapes such as stick-like, columnar, tree-like, needle-like, and conical shapes. The aspect ratio of the rod-like inorganic particle 20 may be 1.5 or more, 1.7 or more, or even 5 or more. Examples of the upper limit of the aspect ratio are as described above regardless of the shape of the inorganic particle 20.

When the inorganic particles 20 have a sphere-like shape, the average particle diameter thereof is, for example, 0.1 $\mu$m to 50 $\mu$m, preferably 0.1 $\mu$m to 10 $\mu$m, and more preferably 0.5 $\mu$m to 5 $\mu$m. When the inorganic particle 20 has a rod-like shape, a length of a minor axis of the inorganic particle 20 is, for example, 0.01 $\mu$m to 10 $\mu$m and preferably 0.05 $\mu$m to 1 $\mu$m. When the inorganic particle 20 has a rod-like shape, a length of a major axis of the inorganic particle 20 is, for example, 0.1 $\mu$m to 20 $\mu$m and preferably 0.5 $\mu$m to 10 $\mu$m. When the inorganic particles 20 have a scaly shape, the average dimension of the principal surfaces of the inorganic particles 20 is, for example, 0.1 $\mu$m to 20 $\mu$m and preferably 0.5 $\mu$m to 15 $\mu$m. When the inorganic particle 20 has a scaly shape, the thickness of the inorganic particle 20 is, for example, 0.05 $\mu$m to 1 $\mu$m and preferably 0.08 $\mu$m to 0.5 $\mu$m. When the inorganic particle 20 has a rod-like shape, the minimum diameter (commonly the length of the minor axis) of the inorganic particle 20 is, for example, 0.01 $\mu$m to 10 $\mu$m and preferably 0.05 $\mu$m to 1 $\mu$m. When the inorganic particle 20 has a rod-like shape, the maximum diameter (commonly the length of the major axis) of the inorganic particle 20 is, for example, 0.1 $\mu$m to 20 $\mu$m and preferably 0.5 $\mu$m to 10 $\mu$m. When the size of the inorganic particle 20 is in these ranges, the inorganic particles 20 are likely to be placed along the void 40, the heat transmission path 5 stretching through the plurality of voids 40 can be reliably formed. When the inorganic particles 20 have a granular shape, the average particle diameter thereof is, for example, 10 $\mu$m to 100 $\mu$m, and preferably 20 $\mu$m to 60 $\mu$m.

The amount of the inorganic particles 20 in the composite material 1 is not limited to a particular value. The amount of the inorganic particles 20 in the composite material 1 is, for example, 10 mass % to 80 mass %, preferably 10 mass % to 70 mass %, and more preferably 10 mass % to 55 mass %. The amount of the inorganic particles 20 in the composite material 1 is, for example, 1 volume % to 50 volume %, preferably 2 volume % to 45 volume %, more preferably 5 volume % to 40 volume %, and particularly preferably 5 volume % to 30 volume %. The composite material 1 can exhibit higher heat conduction performance and an appropriate rigidity by appropriate adjustment of the amount of the inorganic particles 20.

The amount [mass %] of the inorganic particles 20 in the composite material 1 can be determined by removing a material other than the inorganic particle 20 from the composite material 1 by, for example, burning. For accurate measurement, the amount [mass %] of the inorganic particles may be calculated by element analysis. Specifically, an acid is added to the composite material 1, and a microwave is applied to the acid and the composite material 1 for acid decomposition of the composite material 1 under pressure. For example, hydrofluoric acid, concentrated sulfuric acid, concentrated hydrochloric acid, aqua regia, or the like can be used as the acid. Element analysis is performed by an inductively coupled plasma atomic emission spectroscopy (ICP-AES) for a solution obtained by the acid decomposition under pressure. The amount [mass %] of the inorganic particles 20 can be determined on the basis of the analysis result.

The amount [volume %] of the inorganic particles 20 in the composite material 1 can be determined from the mass and density of the inorganic particles 20 included in the composite material 1 and the volume and void ratio of the composite material 1. Specifically, a volume A of the inorganic particles 20 in the composite material 1 is calculated from the mass and density of the inorganic particles 20. Separately, a volume B of the composite material 1 is calculated on the basis of the void ratio of the composite material 1, the volume B not including the volume of the voids 40. The amount [volume %] of the inorganic particles 20 can be determined by (A/B)×100. The method for calculating the void ratio will be later described.

The density of the inorganic particles 20 can be determined according to Japanese Industrial Standards (JIS) R 1628: 1997 or JIS Z 2504: 2012 for the inorganic particles 20 left over after burning an organic material by heating the composite material 1 in an electric furnace at high temperatures.

At least a portion of the inorganic particles 20 is present on the wall surface of the solid portion 10, the wall surface facing the voids 40. Other portions 21 and 22 of the inorganic particles 20 may be present at the connecting portion 43 between the voids 40. On the wall surface of the solid portion 10, a portion 23 of the inorganic particles 20 may be stacked on another inorganic particle 20. At least a portion of the inorganic particles 20 is in contact with or very close to the inorganic particle adjacent thereto and form a portion of the heat transmission paths 5 and 6. However, another portion 24 of the inorganic particles 20 may be surrounded by the resin 30. In other words, the solid portion 10 can include the inorganic particle 24 not in contact with the void 40.

Substantially all the inorganic particles 20 may each be present on the wall surface of the solid portion 10 or at the connecting portion 41 or 43 between the voids 40. Herein, the term "substantially all" means 70 mass % or more, even 80 mass % or more, and particularly 90 mass % or more. In this embodiment, a proportion of the inorganic particles contributing to improvement of the heat conductivity is higher. Distribution of the inorganic particles 20 inside the solid portion 10 can be analyzed, for example, using an ultra-high-resolution field-emission scanning electron microscope by energy dispersive X-ray spectroscopy.

A portion of the wall surface of the solid portion 10 may be formed of a material, typically the resin 30, other than the inorganic particle 20, the wall surface facing the void 40. The resin 30 is, for example, a later-described second resin.

The resin 30 of the solid portion 10 is, for example, a crosslinking polymer, and specifically a thermosetting resin. Examples of the thermosetting resin include phenolic resins, urea resins, melamine resins, diallyl phthalate resins, polyester resins, epoxy resins, aniline resins, silicone resins, furan resins, polyurethane resins, alkylbenzene resins, guanamine resins, xylene resins, and imide resins. A curing temperature of the resin is, for example, 25° C. to 160° C.

Outer shapes of the voids 40 and 50 may be in a sphere-like shape, and may be substantially spherical. Herein, the term "substantially spherical" means that a ratio (maximum diameter/minimum diameter) of the maximum diameter to the minimum diameter is 1.0 to 1.5, particularly 1.0 to 1.3. However, the outer shapes of the voids 40 and 50 are not limited to particular shapes. The outer shapes of the voids 40 and 50 may be a rod-like or polyhedral shape, or may be an ellipsoidal shape having too large a ratio of the maximum diameter to the minimum diameter to call the shape a sphere-like shape. 50% or more or even 80% or more of the voids 40 and 50 may have a sphere-like shape. It is difficult to form voids having shapes as uniform as the above by a foaming technique, by which irregularly shaped voids are formed.

The average diameter of the voids 40 is not limited to a particular value. The average diameter of the voids 40 is, for example, 50 µm to 5000 µm, preferably 100 µm to 2000 µm, and more preferably 300 µm to 1500 µm. Herein, the "average diameter" of the voids 40 refers to the average of diameters thereof determined by observation of a cross-section of the composite material 1 using a SEM. Specifically, any one hundred voids 40 that are each observable entirely are measured for their maximum and minimum diameters, the average of the maximum and minimum diameters of each void is defined as the diameter of the void, and the average of the diameters of fifteen voids having the largest to fifteenth largest diameters is defined as the "average diameter". However, depending on the size of the voids 40, an optical microscope may be used instead of a SEM to measure the average diameter of the voids 40. It should be noted that when the particle diameters of the first resins used in a later-described composite material manufacturing method are highly uniform, the particle diameters of the first resins and the average diameter of the voids of the composite material are substantially the same and any of the particle diameters of the first resins is considered the average diameter of the voids of the composite material.

In the composite material 1, a ratio of the volume of the voids 40 to the volume of the composite material 1, namely, the void ratio, is not limited to a particular value. The void ratio is, for example, 10 volume % to 60 volume %, preferably 15 volume % to 50 volume %, and more preferably 20 volume % to 45 volume %.

The void ratio can be determined by observing a cross-section of the composite material 1 using a SEM, calculating a ratio of the total area of the voids 40 to the total area observed, and averaging thus-obtained ratios in 10 images of different cross-sections. However, the void ratio may be determined in the following manner only when the manufacturing process is known. From the mass of the later-described first resin and the mass of the composite particle in which the inorganic particles 20 are placed on a surface of the first resin, the mass of the inorganic particles 20 included in the composite particle is calculated. Separately, the amount [mass %] of the inorganic particles 20 in the composite material 1 is calculated by inorganic element analysis. The mass of the inorganic particles 20 in the composite material 1 is calculated from the amount [mass %] of the inorganic particles 20 and the mass of the composite material 1. The number of composite particles used to manufacture the composite material 1 is calculated from the mass of the inorganic particles 20 in the composite material 1 and the mass of the inorganic particles 20 included in the composite particle. The volume of the void 40 is calculated from the average diameter of the voids 40. The total volume of the voids 40 in the composite material 1 is determined by multiplying the volume of the void 40 by the number of the composite particles. The total volume of the voids 40 in the composite material 1 is divided by the volume of the composite material 1 to calculate the void ratio.

The plurality of voids 40 may have substantially similar outer shapes. Herein, the term "substantially similar" means that on a number basis, 80% or more, particularly 90% or more, of the voids 40 have the same type of a geometric shape, for example, a sphere-like or regular polyhedron shape. The outer shapes of the substantially similar voids 40 preferably have sphere-like shapes. The outer shapes thereof may be substantially spherical. A plurality of voids formed by foaming can also come in contact with each other as a result of expansion. However, in this case, an internal pressure caused by foaming commonly acts on a connecting portion between the voids, greatly deforming a vicinity of the connecting portion. Therefore, it is virtually impossible to form a plurality of voids in contact with each other and having substantially similar outer shapes by a foaming technique.

The porous structure may have a through hole extending from one principal surface to the other principal surface of the composite material 1. When the composite material 1 has a plate shape, the void provided on one principal surface of the composite material 1 may communicate to a space facing the other principal surface of the composite material 1. The void provided on one principal surface of the composite material 1 may communicate to a space in contact with a lateral face adjacent to the one principal surface of the composite material 1. With such structural features, the composite material 1 can have both heat conductivity and air permeability. Herein, the term "principal surface" of the composite material 1 refers to a surface thereof having the largest area.

The plurality of voids 40 may be locally in contact with each other. In this case, the strength of the composite material 1 is unlikely to be decreased even when the void ratio is increased. The diameter of a communicating portion allowing communication between the voids at the connecting portion 41 may be 25% or less, 20% or less, or even 15% or less of the average diameter of the voids 40. The diameter of the communicating portion can be measured by a SEM or X-ray CT, as for the average diameter. Since the inorganic particle 21 separates the voids 40 at the connecting portion 43, there is no communicating portion at the connecting portion 43.

In the composite material 1 according to the present embodiment, for example, a value $P_0$ determined by the following equation (1) may be 30 or more. In this case, the composite material 1 whose physical properties and functions, such as elastic modulus, hardness, shock-absorbing properties, and anti-vibration properties, are unlikely to vary can be obtained. Moreover, in this case, the amount of the inorganic particles 20 used can be reduced and thus the manufacturing cost of the composite material 1 can be reduced.

$$P_0 = \text{(the average diameter}[\mu m]\text{ of the voids }\mathbf{40}\text{/the average particle diameter}[\mu m]\text{ of the inorganic particles }\mathbf{20})\times\text{(the void ratio}[\text{volume }\%]\text{/}100) \quad \text{Equation (1)}$$

The upper limit of the value $P_0$ is not limited to a particular value. The upper limit of the value $P_0$ is, for example, 1000, preferably 700, more preferably 500, and particularly preferably 450.

As is obvious from the above description, the composite material 1 may be a non-foam body. Conventional foam bodies as described in Patent Literature 1 cannot have characteristic structures as shown in FIGS. 1 and 2, namely, structures in which placement of the inorganic particles 20 is controlled delicately and precisely.

Figure 3:
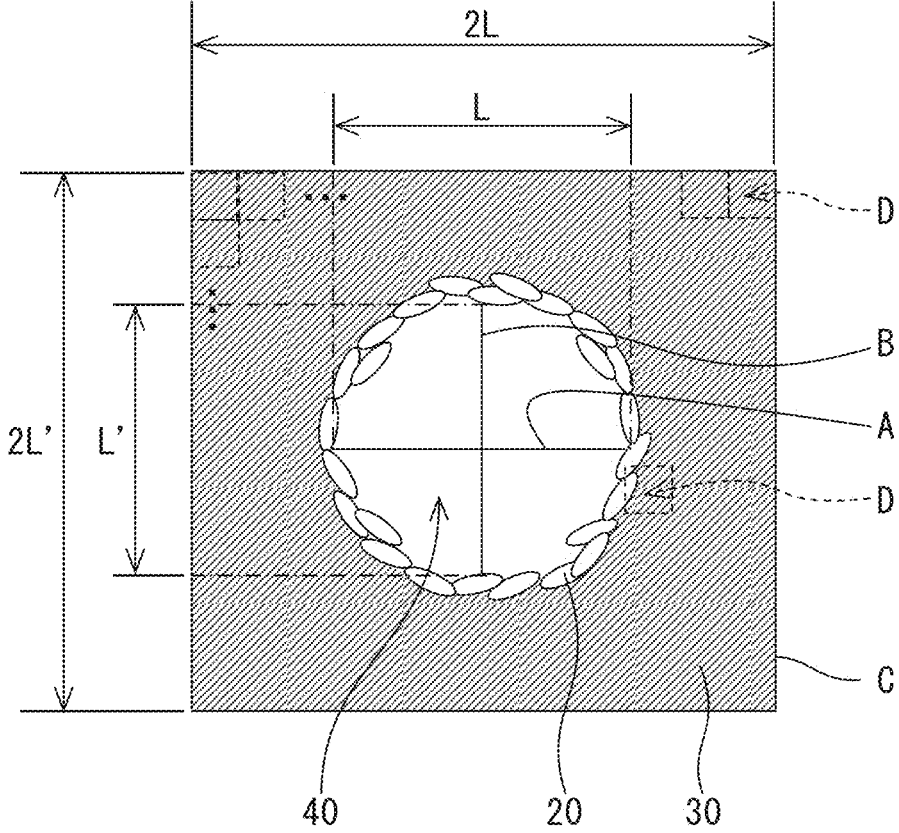
FIG. 3 illustrates a measurement position in the composite material according to the present embodiment measured by energy dispersive X-ray spectroscopy using an ultra-high-resolution field-emission scanning electron microscope.

An example of a method for determining herein a measurement region for determining elemental composition in a particular region of the composite material 1 will be described with reference to FIG. 3. First, the void 40 of the composite material 1 is observed using a SEM. The maximum diameter of the void 40 observed using the SEM was measured, and a line segment A having a length L of the maximum diameter is defined. Next, a line segment B passing through a midpoint of the line segment A to be perpendicular to the line segment A is defined, the line segment B having a length L' from one end of the void 40 to the other end of the void 40. Furthermore, a rectangle C having a center of gravity at the midpoint of the line segment A is defined, the rectangle C having a first side and a second side adjacent to the first side, the first side being parallel to the line segment A and having a length (2L in a direction parallel to the line segment A) twice as long as the line segment A, the second side being parallel to the line segment B and having a length (2L' in a direction parallel to the line segment B) twice as long as the line segment B. A region determined by removing a void portion from the rectangle C is defined as a measurement region.

This measurement region is divided into a plurality of regions D each defined by a 50-$\mu m$ square. For each of the plurality of regions D, a proportion of an atom included in the region D is analyzed. For example, energy dispersive X-ray spectroscopy using an ultra-high-resolution field-emission scanning electron microscope is employed for the analysis.

As a result of the above analysis of the plurality of regions D, a largest proportion [atomic %] of the atom (e.g., B) included in the inorganic particle(s) is defined as Y, the largest proportion being determined for one of the plurality of regions D. Similarly, a smallest proportion [atomic %] of the atom (e.g., B) included in the inorganic particle(s) is defined as X, the smallest proportion being determined for another one of the plurality of regions D. Y/X satisfies, for example, a relation $Y/X \geq 2$. The lower limit of Y/X may be 2.2, 2.5, or, in some cases, 3.0. The upper limit of Y/X is not limited to a particular value. The upper limit of Y/X may be 10 or 9.5. When the inorganic particle is formed of a compound, the atom to be analyzed is recommended to be an element of a cation in the compound. When the inorganic particle is formed of a simple substance, the atom to be analyzed is recommended to be an element forming the simple substance. For example, when the inorganic particle is formed of boron nitride (BN), the atom to be analyzed is boron (B). When the inorganic particle is formed of alumina ($Al_2O_3$), the atom to be analyzed is aluminum (Al).

The region D for which Y is determined may be a region having no additional void between the region D and the void 40, i.e., a region adjacent to the void 40. In the present embodiment, a value Q determined by the following equation is, for example, 65 or more. The value Q may be 68 or more or 70 or more. The maximum of the value Q is not limited to a particular value. The maximum of the value Q may be 100 or 95.

$$Q = 100 \times Y/(Y+X)$$

<Composite Material Manufacturing Method>

An example of a method for manufacturing the composite material 1 according to the present embodiment will be described hereinafter.

The composite material 1 includes: the solid portion 10 including a second resin; and the plurality of voids 40. The method for manufacturing the composite material 1 includes, in the following order: charging a fluid in a gap of a particle aggregate including a plurality of first resins, which are typically resin particles, the fluid including a second resin or a precursor of the second resin; and shrinking or removing the plurality of resin particles by heating the plurality of resin particles to form the plurality of voids 40. Surfaces of the plurality of resin particles include the plurality of the inorganic particles 20.

First, a mixture of the first resin and an adhesive is produced to obtain the composite particles. The adhesive is an adhesive for adhering the inorganic particles 20 to the surface of the first resin particle. The adhesive includes, for example, polyethylene glycol (PEG) and/or an emulsion. Next, the inorganic particles 20 are added to and mixed with the mixture to obtain composite particles in which the inorganic particles 20 are placed on the surface of the first resin. The mixing method is not limited to a particular method. Examples of the mixing method include mixing using a ball mill, a bead mill, a planetary mixer, an ultrasonic mixer, a homogenizer, or a planetary centrifugal mixer.

Next, the composite particles are put in a mold such that the composite particles are in contact with each other to form a particle aggregate. A fluid separately prepared is further added to the mold to prepare a mixed body. The fluid includes the second resin. The fluid may include the precursor of the second resin. The fluid is charged in the gap of the particle aggregate in which at least two of the plurality of composite particles are in contact with each other. The fluid is present at least on a surface of the composite particle and in a portion where the composite particles are in contact with each other. In this manner, the aggregate of the composite particles is formed in which at least two of the plurality of composite particles are in contact with each other such that a heat transmission path formed of the inorganic particles 20 in contact with each other stretches along the surfaces of the plurality of composite particles.

Next, bubbles are removed from the mixed body. The method for removing bubbles from the mixed body is not limited to a particular method. An example of the method is degassing under reduced pressure. Degassing under reduced pressure is performed, for example, at 25° C. to 200° C. for 1 second to 10 seconds.

Subsequently, the flowability of the fluid is decreased by heating the mixed body. Heating of the fluid causes progression of, for example, a reaction of generating the second resin from the precursor of the second resin or curing of the second resin, thereby decreasing the flowability of the fluid. The solid portion 10 including the second resin is generated in this manner. A precursor of the composite material can be obtained in this manner.

Next, the composite material 1 is produced by shrinking the first resin or removing the first resin from the precursor of the composite material. The method for shrinking the first resin or removing the first resin from the precursor of the composite material is not limited to a particular method. Examples of the method include a method in which the precursor of the composite material is heated and a method in which the precursor of the composite material is immersed in a particular solvent. These methods may be used in combination. The voids 40 are formed by shrinking or removing the first resins. In this manner, the inorganic particles 20 are "transferred" from the surface of the first resin to a surface of the second resin, and the composite material 1 in which the inorganic particles 20 are on a wall surface of the second resin can be obtained.

A temperature at which the precursor of the composite material is heated is not limited to a particular temperature as long as the first resin can be softened at the temperature. The temperature may be, for example, 95° C. to 130° C. or 120° C. to 160° C.

In the case where the precursor of the composite material is immersed in a particular solvent, the solvent is not limited to a particular solvent as long as the solvent does not dissolve the second resin but can dissolve the first resin. Examples of the solvent include toluene, ethyl acetate, methyl ethyl ketone, and acetone.

The first resin (resin particle) may have a hollow structure. A hollow portion in the hollow structure may be a single hollow portion, or may be formed of a plurality of hollow portions as a foamed resin bead is. When the resin particles having the hollow structure are used, a resin forming the first resins is softened by a heating treatment and the hollow portions therein disappear or shrink to form the plurality of voids 40. However, the hollow structure of the resin particle is not essential. In the case where the precursor of the composite material is immersed in a particular solvent, it is preferable that the first resin be, for example, more easily dissolved in the solvent than the second resin. The void 40 having a desired shape is likely to be formed by this method. Examples of the material of the first resin include polystyrene (PS), polyethylene (PE), polymethyl methacrylate (PMMA), ethylene-vinyl acetate copolymer (EVA), polyethylene (PE), polyvinyl chloride (PVC), polypropylene (PP), acrylonitrile-butadiene-styrene copolymer (ABS), ethylene-propylene-diene rubber (EPDM), and thermoplastic elastomers (TPE). The resin particle may be produced by a later-described method, or a commercially-available resin particle having a particular size may be used as the resin particle. A raw material of the second resin is, for example, a crosslinking polymer, or any of the thermosetting resins shown above as examples of the resin 30.

The size of the first resin is not limited to a particular one. When the first resin is spherical, the average diameter thereof is, for example, 50 µm to 5000 µm, preferably 300 µm to 2000 µm, and particularly 500 µm to 1500 µm. The composite material 1 can have an appropriate void ratio by appropriate adjustment of the size of the first resin. In addition, the composite material can have the voids of an appropriate size by appropriate adjustment of the size of the first resin. Resin particles of different sizes selected from the above sizes may be used as the first resins. That is, the plurality of first resins may have substantially similar outer shapes from each other. As a result, the plurality of voids 40 of the composite material 1 can have substantially similar outer shapes from each other.

According to the method for manufacturing the composite material 1 according to the present embodiment, at least a portion of the inorganic particles 20 can face the void 40. Moreover, a heat transmission path stretching through the plurality of voids 40 can be formed of the inorganic particles 20.

According to the method for manufacturing the composite material 1 according to the present embodiment, the voids 40 are formed without a foaming step. That is, the voids 40 are not formed by foaming.

EXAMPLES

Hereinafter, the present invention will be described in more detail with reference to examples. The present invention is not limited to the following examples.
(Production of Polystyrene Beads)

Into an autoclave equipped with a stirrer were added 100 parts by weight of pure water, 0.2 parts by weight of tricalcium phosphate, and 0.01 parts by weight of sodium dodecylbenzene sulfonate. Into the autoclave were added 0.15 parts by weight of benzoyl peroxide and 0.25 parts by weight of 1,1-bis(t-butylperoxy)cyclohexane as initiators to produce a liquid mixture. An amount of 100 parts by weight of a styrene monomer was added to the liquid mixture while the liquid mixture was stirred at 350 revolutions per minute. After that, the temperature of the solution was increased to 98° C. to perform a polymerization reaction. When the polymerization reaction is about 80% complete, the temperature of the reaction solution was increased to 120° C. over 30 minutes. The reaction solution was then maintained at 120° C. for 1 hour to produce a styrene-resin-particle-containing solution. The styrene-resin-particle-containing solution was cooled to 95° C., and then 2 parts by weight of cyclohexane and 7 parts by weight of butane as blowing agents were introduced into the autoclave by pressure. After that, the temperature of the solution was increased to 120°

C. again. The solution was then maintained at 120° C. for 1 hour and then cooled to room temperature to obtain a polymerized slurry. The polymerized slurry was dehydrated, washed, and dried to obtain expandable styrene resin particles. The expandable styrene resin particles were sieved to obtain expandable styrene resin particles having a particle diameter of 0.2 mm to 0.3 mm. From the expandable styrene resin particles, sphere-like expanded polystyrene beads having an average diameter of 650 μm to 1200 μm were obtained using a pressurized foaming machine (BHP) manufactured by Obiraki Industry Co., Ltd. The expanded polystyrene beads were sieved using JIS test sieves having nominal aperture sizes (JIS Z 8801-1: 2019) of 1.18 mm and 1 mm. Expanded polystyrene beads passing through the sieve having a nominal aperture size of 1.18 mm and not passing through the sieve having a nominal aperture size of 1 mm were used. Furthermore, the expanded polystyrene beads were sieved using plain-woven metal meshes having aperture sizes of 0.69 mm and 0.63 mm and manufactured by Okutani Ltd. Expanded polystyrene beads passing through the metal mesh having an aperture size of 0.69 mm and not passing through the metal mesh having an aperture size of 0.63 mm were also used.

(Sample 1)

The sphere-like polystyrene beads (average diameter: 1000 μm) (bulk density: 0.025 g/cm³) as described above and polyethylene glycol (PEG-400 manufactured by Wako Pure Chemical Industries, Ltd.) were weighed and added to a glass container at a weight ratio of 1:1. The mixture was stirred using a planetary centrifugal mixer (ARE-310) manufactured by THINKY CORPORATION. Next, scaly boron nitride (UHP-1K, average dimension of principal surfaces: 8 μm; thickness: 0.4 μm) manufactured by SHOWA DENKO K.K. was further added to the mixture so that the polystyrene beads and the boron nitride would be in a weight ratio of 1:2, and thus a mixture was prepared. The mixture was kneaded for 5 minutes using a planetary centrifugal mixer at 2000 revolutions per minute (rpm) to produce polystyrene beads coated with boron nitride.

A silicone resin (KE-106F) and silicone oil (KF-96-10CS) both manufactured by Shin-Etsu Chemical Co., Ltd. were added at a weight ratio of 10:5. To the resulting mixture was further added a curing agent (CAT-106F) manufactured by Shin-Etsu Chemical Co., Ltd. so that the silicone resin and the curing agent would be in the weight ratio of 10:0.85, and thus a thermosetting resin was produced.

The polystyrene beads coated with boron nitride were charged in a 95 mm×95 mm×24 mm plastic case, a plain-woven metal mesh (diameter: 0.18 mm; 50-mesh) made of stainless steel and manufactured by YOSHIDA TAKA K. K. was laid on the plastic case, and a perforated metal (diameter: 5 mm; thickness: 1 mm; pitch: 8 mm) made of stainless steel was further laid on the plain-woven metal mesh. The plastic case, the plain-woven metal mesh, and the perforated metal were fixed with a clamp.

The above-described thermosetting resin was added into the plastic case and defoamed under reduced pressure. The pressure applied was −0.08 MPa to −0.09 MPa in gauge pressure. This process was repeated three times to impregnate a gap between the polystyrene beads with the thermosetting resin. Next, the silicone resin was cured by heating at 80° C. for 2 hours to obtain a resin molded article including polystyrene beads. The resin molded article was cut to given dimensions. The resulting resin molded article was heated at 130° C. for 30 minutes to soften the polystyrene beads and let the polystyrene beads flow out of the resin molded article. A composite material according to Sample 1 was produced in this manner.

(Samples 2 to 5)

Composite materials according to Samples 2 to 4 were each obtained in the same manner as in Sample 1, except that the polystyrene beads and the boron nitride described in Table 3 were used and a mixture was prepared at a ratio described in Table 1. A composite material according to Sample 5 was obtained in the same manner as in Sample 1, except that the polystyrene beads and the boron nitride described in Table 3 were used, a mixture was prepared at a ratio described in Table 1, and a silicone resin including 30 mass % of boron nitride was used instead of the thermosetting resin.

(Sample 6)

The polystyrene beads (average diameter: 1000 μm) as described above, boron nitride (UHP-1K, average dimension of principal surfaces: 8 μm; thickness: 0.4 μm) manufactured by SHOWA DENKO K.K., and a silicon resin as described above were weighed to amounts described in Table 1, added to a glass container, and mixed. A composite material according to Sample 6 was produced in the same manner as in Sample 1, except that only this mixture was charged in a plastic case.

(Sample 7)

Boron nitride (HGP; average dimension of principal surfaces: 5 μm; thickness: 0.1 μm) manufactured by Denka Company Limited, a silicone resin, and ethanol were weighed to amounts described in Table 2, added, and mixed to prepare a mixture in a slurry state. The mixture was added to a tubular mold having a bottom and having a diameter of 50 mm and a height of 7 mm. Next, the mixture in the mold was heated at 100° C. for 1 hour to foam the silicone resin by the ethanol and cure the foamed silicone resin. A composite material according to Sample 7 was obtained in this manner.

(Sample 8)

A composite material according to Sample 8 was obtained in the same manner as in Sample 7, except that an unsaturated polyester resin (WP-2820) manufactured by Hitachi Chemical Company, Ltd. was used instead of the silicone resin and that the mixture was heated at 150° C. for 1 hour.

(Calculation of Amount [Volume %] of Inorganic Particles)

The amounts [volume %] of the inorganic particles in the composite materials according to Samples 1 to 8 were determined in the following manner. First, an organic substance was removed from each of the composite materials according to Samples 1 to 8 to extract the inorganic particles. The mass of the extracted inorganic particles was divided by the density (2.3 g/cm³) of boron nitride to calculate the volume A of the inorganic particles. Separately, the volume B of the composite material was calculated from the volume and void ratio of the composite material, the volume B not including the volume of the voids 40. The amount [volume %] of the inorganic particles in the composite material was determined by (A/B)×100.

(Calculation of Amount [Mass %] of Inorganic Particles)

The amounts [mass %] of the inorganic particles in the composite materials according to Samples 1 to 8 were determined in the following manner. First, about 10 mg of each of the composite materials according to Samples 1 to 8 was weighed out and added to a fluorine resin container. Hydrofluoric acid was added to the fluorine resin container, which was then sealed. A microwave was applied to the fluorine resin container to perform acid decomposition under pressure at a highest temperature of 220° C. Ultrapure water was added to the resulting solution to adjust the volume to 50 mL. Boron in the solution was quantified using ICP-AES SPS-3520UV manufactured by Hitachi High-Tech Science Corporation to determine the amount [mass %] of the inorganic particles.

(Heat Conductivity Measurement 1)

Heat conductivities of the composite materials according to Samples 1 to 8 were measured for one test specimen in a symmetric configuration by a heat flow meter method using a heat conductivity measurement apparatus TCM1001 manufactured by RHESCA Co., LTD. according to the American Society for Testing and Materials (ASTM) standard D5470-01 (steady state longitudinal heat flow method). Specifically, first, each composite material having a thickness t of 4000 μm was cut to 20 mm×20 mm to obtain a test piece. A silicone grease (SHC-20; heat conductivity: 0.84 W/(m·K)) manufactured by Sunhayato Corp. was applied to both principal surfaces of the test piece so that each of the resulting silicone grease layers would have a thickness of 100 μm. An upper rod having a heating block (80° C.) and a lower rod having a cooling block (20° C.) were used as standard rods. Blocks made of oxygen-free copper were used as test blocks. The test piece was sandwiched by the blocks made of oxygen-free copper via the silicone grease layers to produce a measurement specimen. The measurement specimen was sandwiched between the upper rod and the lower rod. Heat was allowed to flow in the thickness direction of the test piece.

A temperature difference $\Delta T_S$ between upper and lower surfaces of the test piece was determined by the following equations (2) and (3). In the equations (2) and (3), $\Delta T_C$ is a temperature difference between the upper surface of the upper block (test block) made of oxygen-free copper and the lower surface of the lower block (test block) made of oxygen-free copper. Additionally, $q_1$ represents a heat flux [W/m$^2$] determined by a temperature gradient calculated based on temperature differences between a plurality of temperature measurement points on the upper rod, and $q_2$ represents a heat flux [W/m$^2$] determined by a temperature gradient calculated based on temperature differences between a plurality of temperature measurement points on the lower rod. A symbol $t_b$ represents the sum of the thicknesses of the blocks made of oxygen-free copper. A symbol $k_b$ represents the heat conductivity of the blocks made of oxygen-free copper.

$$\Delta T_S = \Delta T_C - (q_S \times t_b)/k_b \qquad \text{Equation (2)}$$

$$q_S = (q_1 + q_2)/2 \qquad \text{Equation (3)}$$

A heat conductivity $\lambda_1$ [W/(m·K)] in the thickness direction of the test piece was determined by the following equation (4). Tables 3 and 4 show the values Ai of heat conductivities obtained by the above (Heat conductivity measurement 1).

$$\lambda_1 = q_S \times t/\Delta T_S \qquad \text{Equation (4)}$$

(Measurement of Compressive Elastic Modulus)

Compressive elastic moduli of the composite materials according to Samples 1 to 8 were measured using a dynamic viscoelastic measurement apparatus RSA G2 manufactured by TA Instruments Japan Inc. A 25 mm$^2$ principal surface of each composite material having a thickness of 4 mm was compressed by 0% to 5% at a compression rate of 0.01 mm/s. A strain x of the composite material and a stress y of the composite material were measured for every 0.2% compression of the principal surface of the composite material. From the strains x of the composite material and the stresses y of the composite material at measurement points, an arithmetic average $x_{ave}$ of the strains x of the composite material and an arithmetic average $y_{ave}$ of the stresses y of the composite material, respectively, were calculated. An elastic modulus b was calculated by the following equation (5).

$$b = \Sigma\{(x - x_{ave})(y - y_{ave})\} \div \Sigma(X - x_{ave})^2 \qquad \text{Equation (5)}$$

(Reaction Force at 10% Compression)

A pressure on each of the composite materials according to Samples 1 to 8 being at room temperature, having a thickness of 4 mm, and having a 100 mm$^2$ principal surface was measured using a dynamic viscoelastic measurement apparatus RSA G2 manufactured by TA Instruments Japan Inc. after the composite material was compressed by 10% of the thickness thereof for 30 seconds. The pressure was defined as a reaction force.

(Measurement of Asker C Hardness)

Asker C hardnesses of test pieces formed of the composite materials according to Samples 1 to 8 were measured according to Japanese Industrial Standards (JIS) K 7312: 1996 using ASKER Durometer Type C manufactured by KOBUNSHI KEIKI CO., LTD. Each test piece used in the measurement was a laminate of three 4-mm-thick pieces of the composite material. Tables 3 and 4 show the results.

The composite materials according to Samples 1 to 5 have a compressive elastic modulus of 100 kPa to 600 kPa. Additionally, the composite materials according to Samples 1 to 5 have a heat conductivity of 0.5 W/(m·K) or more. These reveal that the composite materials according to Samples 1 to 5 easily change their shapes in response to a compressive force.

Figure 4:
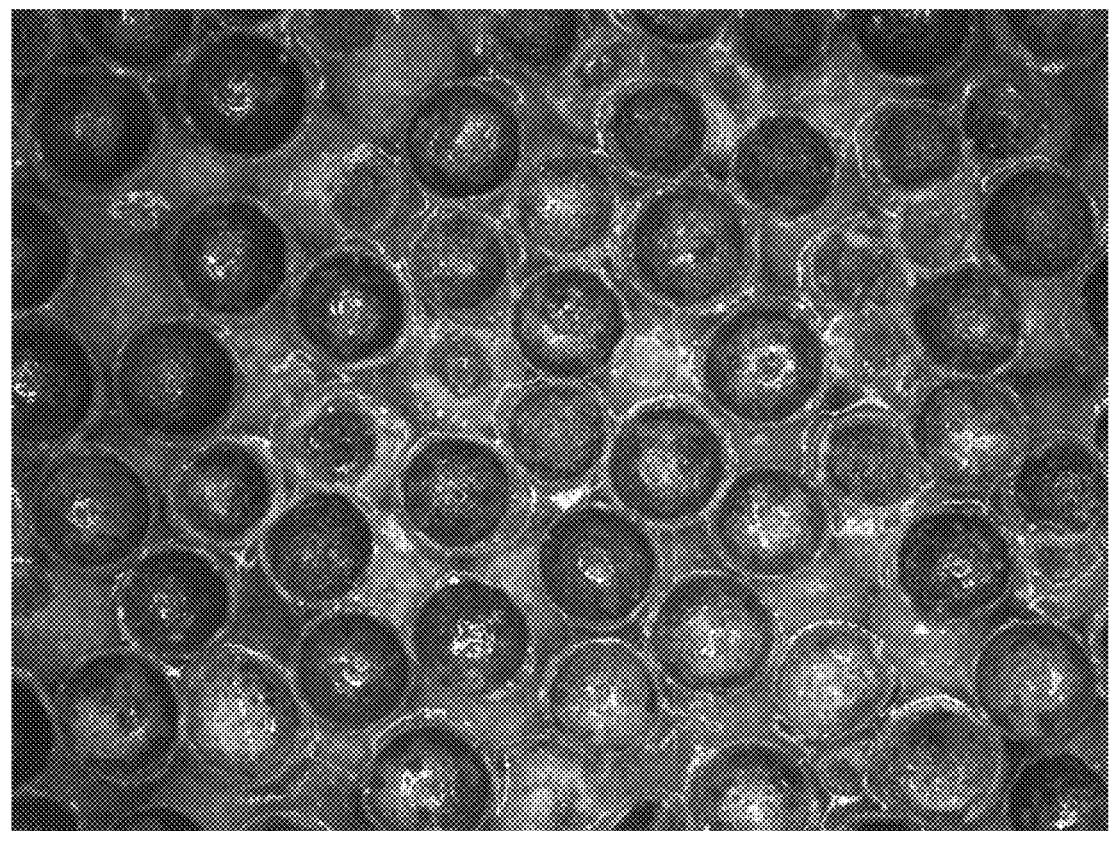
FIG. 4 shows the results of optical microscope observation of a cross-section of a composite material according to Sample 1.

As shown in FIG. 4, the composite material according to Sample 1 includes a solid portion including inorganic particles and a resin, and includes a plurality of voids surrounded by the solid portion. In the composite material according to Sample 1, the voids have substantially similar outer shapes to each other. Additionally, the outer shapes of the voids are substantially spherical. Moreover, the plurality of voids are in contact with each other directly or via the inorganic particle.

TABLE 1

| | Sample 1 | Sample 2 | Sample 3 | Sample 4 | Sample 5 | Sample 6 |
|---|---|---|---|---|---|---|
| Polystyrene beads [mass %] | 7 | 10 | 5 | 6 | 7 | 5 |
| Polyethylene glycol [mass %] | 7 | 5 | 5 | 5 | 7 | 5 |
| Boron nitride [mass %] | 14 | 32 | 34 | 21 | 15 | 20 |
| Resin [mass %] | 72 | 53 | 56 | 68 | 40 | 70 |

TABLE 2

|  | Sample 7 | Sample 8 |
| --- | --- | --- |
| Boron nitride [mass %] | 60 | 61 |
| Silicone resin [mass %] | 39 | — |
| Unsaturated polyester resin [mass %] | — | 38 |
| Ethanol [mass %] | 1 | 1 |

TABLE 3

|  |  | Sample 1 | Sample 2 | Sample 3 | Sample 4 | Sample 5 | Sample 6 |
| --- | --- | --- | --- | --- | --- | --- | --- |
| Average diameter [μm] of voids |  | 1000 | 650 | 1000 | 1000 | 1000 | 1000 |
| Void ratio [volume %] |  | 27 | 30 | 29 | 25 | 34 | 47 |
| Inorganic particles | Aspect ratio | 20 | 7 | 7 | 65 | 20 | 20 |
|  | Average particle diameter [μm] | — | — | — | — | — | — |
|  | Average dimension [μm] of principal surfaces | 8 | 0.7 | 0.7 | 13 | 8 | 8 |
|  | Thickness [μm] | 0.4 | 0.1 | 0.1 | 0.2 | 0.4 | 0.4 |
|  | Amount [mass %] | 14 | 32 | 34 | 21 | 45 | 20 |
|  | Amount [volume %] | 6 | 10 | 12 | 8 | 23 | 7 |
| Heat conductivity $\lambda_1$ [W/(m · K)] |  | 1.32 | 1.93 | 1.73 | 1.15 | 1.85 | 0.14 |
| $P_0$ |  | 34 | 279 | 414 | 19 | 43 | 59 |
| Compressive elastic modulus [kPa] |  | 490 | 293 | 316 | 495 | 562 | 91 |
| Asker C hardness |  | 27 | 20 | 30 | 42 | 43 | 6 |

TABLE 4

|  |  | Sample 7 | Sample 8 |
| --- | --- | --- | --- |
| Average diameter of voids [μm] |  | 200 | 200 |
| Void ratio [volume %] |  | 50 | 50 |
| Inorganic particles | Aspect ratio | 50 | 50 |
|  | Average dimension [μm] of principal surfaces | 5 | 5 |
|  | Thickness [μm] | 0.1 | 0.1 |
|  | Amount [mass %] | 60 | 61 |
|  | Amount [volume %] | 31 | 36 |
| Heat conductivity $\lambda_1$ [W/(m · K)] |  | 2.27 | 2.36 |
| $P_0$ |  | 20 | 20 |
| Compressive elastic modulus [kPa] |  | 757 | 2450 |
| Asker C hardness |  | 55 | 96 |

(Preparation of Aqueous-Dispersion-Type Acrylic Adhesive)

An amount of 40 parts by weight of ion-exchange water was placed in a reaction container equipped with a cooling pipe, a nitrogen introduction pipe, a thermometer, and a stirrer, and was stirred at 60° C. for 1 hour or longer while a nitrogen gas was being introduced thereto for nitrogen purging. To the reaction container was added 0.1 parts by weight of 2,2'-azobis[N-(2-carboxyethyl)-2-methylpropionamidine]n-hydrate (polymerization initiator) to prepare a liquid mixture. A monomer emulsion A was dropped little by little over 4 hours for an emulsion polymerization reaction while this liquid mixture was maintained at 60° C. A reaction solution was thus obtained. The monomer emulsion A used was obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (product name "KBM-503" manufactured by Shin-Etsu Chemical Co., Ltd.), and 2 parts by weight of polyoxyethylene sodium lauryl sulfate (emulsifier) to 30 parts by weight of ion-exchange water and emulsifying the mixture. After all the monomer emulsion A was dropped, the reaction solution was further maintained at 60° C. for 3 hours and was then cooled to room temperature. Next, 10% ammonia water was added to the reaction solution, and the pH of the reaction solution was adjusted to 7 to obtain an acrylic polymer emulsion (aqueous-dispersion-type acrylic polymer) A. An amount of 10 parts by weight, on a solids basis, of a resin emulsion (product name "E-865NT" manufactured by ARAKAWA CHEMICAL INDUSTRIES, LTD.) for imparting adhesiveness was added per 100 parts by weight of an acrylic polymer included in the acrylic polymer emulsion A to obtain a mixture. Furthermore, distilled water was added to the mixture so that a weight ratio of the mixture to the distilled water would be 10:5. An aqueous-dispersion-type acrylic adhesive was obtained in this manner.

(Sample 9)

The above-described sphere-like polystyrene beads (average diameter: 1000 μm) (bulk density: 0.025 g/cm³) and the aqueous-dispersion-type acrylic adhesive were weighed and added to a glass container at a weight ratio of 1:1. The mixture was added to UNIPACK L-4 manufactured by SEISAN NIPPONSHA LTD. The UNIPACK was sealed and shaken for 5 minutes by hand to mix the mixture. Next, scaly boron nitride (UHP-1K, average dimension of principal surfaces: 8 μm; thickness: 0.4 μm) manufactured by SHOWA DENKO K.K. was further added to the mixture in the UNIPACK so that the polystyrene beads and the boron nitride would be in a weight ratio of 7:19, and thus a mixture was prepared. The UNIPACK was shaken for 5 minutes by hand to produce polystyrene beads coated with boron nitride.

A silicone resin (KE-106F) and silicone oil (KF-96-10CS) both manufactured by Shin-Etsu Chemical Co., Ltd. were added at a weight ratio of 10:5. A curing agent (CAT-106) manufactured by Shin-Etsu Chemical Co., Ltd. was further added to the mixture so that the silicone resin and the curing agent would be in a weight ratio of 10:0.17, and thus a thermosetting resin was produced.

The polystyrene beads coated with boron nitride were charged in a 95 mm×95 mm×24 mm plastic case, a plain-woven metal mesh (diameter: 0.18 mm; 50-mesh) made of stainless steel and manufactured by YOSHIDA TAKA K. K. was laid on the plastic case, and a perforated metal (diameter: 5 mm; thickness: 1 mm; pitch: 8 mm) made of stainless steel was further laid on the plain-woven metal mesh. The plastic case, the plain-woven metal mesh, and the perforated metal were fixed with a clamp.

The above-described thermosetting resin was added into the plastic case and defoamed under reduced pressure. The pressure applied was −0.08 MPa to −0.09 MPa in gauge pressure. This process was repeated three times to impregnate a gap between the polystyrene beads with the thermosetting resin. Next, the silicone resin was cured by heating at 80° C. for 2 hours to obtain a resin molded article including polystyrene beads. The resin molded article was cut to given dimensions. The cut resin molded article was completely immersed in ethyl acetate for 30 minutes to dissolve the polystyrene beads and let the polystyrene beads flow out of the resin molded article. After that, the resin molded article was dried at 90° C. for 3 hours. A composite material according to Sample 9 was produced in this manner.

(Sample 10)

A composite material according to Sample 10 was obtained in the same manner as in Sample 9, except that the polystyrene beads and the boron nitride described in Table 5 were used and a mixture was prepared at a ratio described in Table 5.

(Samples 11 and 12)

Composite materials according to Samples 11 and 12 were each obtained in the same manner as in Sample 9, except that the polystyrene beads and the boron nitride described in Table 5 were used, a urethane resin UF-820A manufactured by Sanyu Rec Co., Ltd. and a curing agent (UF-820B) mixed at a weight ratio of 5.35:10 were used instead of the thermosetting resin, and a mixture was prepared at a ratio described in Table 5.

(Samples 13 to 19)

Boron nitride, a silicone resin, and ethanol were weighed to amounts described in Table 6, added, and mixed to prepare a mixture in a slurry state. The mixture was added to a tubular mold having a bottom and having a diameter of 50 mm and a height of 7 mm. Next, the mixture in the mold was heated at 100° C. for 1 hour to foam the silicone resin by the ethanol and cure the foamed silicone resin. Composite materials according to Samples 13 to 19 were obtained in this manner.

(Heat Conductivity Measurement 2)

Heat conductivities of the composite materials according to Samples 9 to 19 were measured for one test specimen in a symmetric configuration by a heat flow meter method using a heat conductivity measurement apparatus TCM1001 manufactured by RHESCA Co., LTD. according to the American Society for Testing and Materials (ASTM) standard D5470-01 (steady state longitudinal heat flow method). Specifically, first, each composite material having a thickness t was cut to 20 mm×20 mm to obtain a test piece. A silicone grease (SHC-20; heat conductivity: 0.84 W/(m·K)) manufactured by Sunhayato Corp. was applied to both principal surfaces of the test piece so that each of the resulting silicone grease layers would have a given thickness equal to or less than 300 μm. An upper rod having a heating block (110° C.) and a lower rod having a cooling block (20° C.) were used as standard rods. Blocks made of oxygen-free copper were used as test blocks. The test piece was sandwiched by the blocks made of oxygen-free copper via the silicone grease layers to produce a measurement specimen. The measurement specimen was sandwiched between the upper rod and the lower rod. Heat was allowed to flow in the thickness direction of the test piece.

A temperature difference $\Delta T_S$ between upper and lower surfaces of the test piece was determined by the following equations (6) and (7). In the equations (6) and (7), $\Delta T_C$ is a temperature difference between the upper surface of the upper block (test block) made of oxygen-free copper and the lower surface of the lower block (test block) made of oxygen-free copper. Additionally, $q_1$ represents a heat flux [W/m²] determined by a temperature gradient calculated based on temperature differences between a plurality of temperature measurement points on the upper rod, and $q_2$ represents a heat flux [W/m²] determined by a temperature gradient calculated based on temperature differences between a plurality of temperature measurement points on the lower rod. A symbol $t_b$ represents the sum of the thicknesses of the blocks made of oxygen-free copper. A symbol $k_b$ represents the heat conductivity of the blocks made of oxygen-free copper.

$$\Delta T_S = \Delta T_C - (q_S \times t_b)/k_b \qquad \text{Equation (6)}$$

$$q_S = (q_1 + q_2)/2 \qquad \text{Equation (7)}$$

A heat conductivity $\lambda_2$[W/(m·K)] in the thickness direction of the test piece was determined by the following equation (8).

$$\lambda_2 = q_S \times t/\Delta T_S \qquad \text{Equation (8)}$$

Tables 5 and 6 show the values $\lambda_2$ of heat conductivities obtained by the above (Heat conductivity measurement 2). The thickness t of each test piece was determined by measurement using a camera.

(Composition Analysis)

Using an ultra-high-resolution field-emission scanning electron microscope (SU8220) manufactured by Hitachi High-Technologies Corporation, particular regions of each of the composite materials according to Samples 1 to 19 were measured and the proportion of an atom included in the inorganic particle(s) included in each particular region of the composite material was calculated by energy dispersive X-ray spectroscopy. First, a measurement region was determined by the above method for each of the composite materials according to Samples 1 to 19. The proportion of an atom included in the inorganic particle(s) was measured in this measurement region. When the inorganic particle(s) are formed of boron nitride, the measured atom was boron (B). Y/X was calculated, where Y represents the largest proportion [atomic %] of the atom included in the inorganic particle(s) and X represents the smallest proportion [atomic %] of the atom included in the inorganic particle(s) in the measurement region. Additionally, the value Q was calculated by the above method. Tables 5 to 7 show the results.

The composite materials according to Samples 9 to 19 were measured for the compressive elastic modulus, the reaction force at 10% compression, and the Asker C hardness by the above methods. Tables 5 and 6 show the results.

The composite materials according to Samples 9 to 12 compressed by 10% have a reaction force of 0.1 kPa to 1000 kPa. Additionally, the composite materials according to Samples 9 to 12 have a heat conductivity of 0.5 W/(m·K) or more. Moreover, the composite materials according to Samples 9 to 12 have a compressive elastic modus of 100 kPa to 600 kPa. These reveal that the composite materials according to Samples 9 to 12 easily change their shapes in response to a compressive force.

The composite materials according to Samples 1 to 5 compressed by 10% have a reaction force of 0.1 kPa to 1000 kPa. Additionally, the composite materials according to Samples 1 to 5 have a heat conductivity of 0.5 W/(m·K) or more.

TABLE 5

| | Sample 9 | Sample 10 | Sample 11 | Sample 12 |
|---|---|---|---|---|
| Polystyrene beads [mass %] | 7 | 10 | 7 | 7 |
| Aqueous-dispersion-type acrylic adhesive [mass %] | 7 | 5 | 7 | 7 |
| Boron nitride [mass %] | 19 | 28 | 20 | 14 |

21

TABLE 5-continued

| | | Sample 9 | Sample 10 | Sample 11 | Sample 12 |
|---|---|---|---|---|---|
| Resin [mass %] | | 67 | 57 | 66 | 72 |
| Average diameter of voids [μm] | | 1000 | 650 | 1000 | 1000 |
| Void ratio [volume %] | | 27 | 30 | 27 | 27 |
| Inorganic particles | Aspect ratio | 20 | 7 | 20 | 50 |
| | Average dimension [μm] of principal surfaces | 8 | 0.7 | 8 | 5 |
| | Thickness [μm] | 0.4 | 0.1 | 0.4 | 0.1 |
| | Amount [mass %] | 19 | 28 | 20 | 12 |
| | Amount [volume %] | 7 | 9 | 7 | 4 |
| Heat conductivity $\lambda_2$ [W/(m · K)] | | 1.02 | 1.21 | 1.09 | 0.89 |
| $P_0$ | | 34 | 279 | 34 | 54 |
| Reaction force [kPa] at 10% compression | | 3 | 5 | 4 | 8 |
| Asker C hardness | | 4 | 4 | 4 | 5 |
| Y/X | | 4.7 | 9.4 | 5.1 | 5.9 |
| Q | | 82.5 | 90.4 | 83.6 | 85.5 |

TABLE 6

| | | Sample 13 | Sample 14 | Sample 15 | Sample 16 | Sample 17 | Sample 18 | Sample 19 |
|---|---|---|---|---|---|---|---|---|
| Boron nitride [mass %] | | 60 | 14 | 20 | 20 | 20 | 34 | 60 |
| Silicone resin [mass %] | | 39 | 84 | 78 | 78 | 78 | 64 | 38 |
| Ethanol [mass %] | | 2 | 2 | 2 | 2 | 2 | 2 | 2 |
| Average diameter [μm] of voids | | 200 | 200 | 200 | 200 | 200 | 200 | 200 |
| Void ratio [volume %] | | 50 | 50 | 50 | 50 | 50 | 50 | 50 |
| Inorganic particles | Aspect ratio | 50 | 50 | 20 | 7 | 50 | 7 | 20 |
| | Average dimension [μm] of principal surfaces | 5 | 5 | 8 | 0.7 | 5 | 0.7 | 8 |
| | Thickness [μm] | 0.1 | 0.1 | 0.4 | 0.1 | 0.1 | 0.1 | 0.4 |
| | Amount [mass %] | 60 | 14 | 20 | 20 | 20 | 34 | 60 |
| | Amount [volume %] | 31 | 6 | 7 | 7 | 7 | 12 | 32 |
| Heat conductivity $\lambda_2$ [W/(m · K)] | | 1.79 | 0.12 | 0.13 | 0.12 | 0.13 | 0.38 | 1.24 |
| $P_0$ | | 20 | 20 | 13 | 143 | 20 | 143 | 13 |
| Reaction force [kPa] at 10% compression | | 14000 | 90 | 110 | 100 | 130 | 260 | 17000 |
| Asker C hardness | | 42 | 6 | 7 | 6 | 7 | 12 | 54 |
| Y/X | | 1.2 | 1.3 | 1.5 | 1.3 | 1.4 | 1.3 | 1.2 |
| Q | | 55.1 | 55.7 | 60.5 | 55.9 | 57.6 | 56.8 | 55.3 |

40

TABLE 1

| | Sample 1 | Sample 2 | Sample 3 | Sample 4 | Sample 5 | Sample 6 | Sample 7 | Sample 8 |
|---|---|---|---|---|---|---|---|---|
| Reaction force [kPa] at 10% compression | 421 | 174 | 384 | 490 | 882 | 10 | 18000 | 262000 |
| Y/X | 4.4 | 9.2 | 5.7 | 5.9 | 1.4 | 1.3 | 1.8 | 1.3 |
| Q | 81.6 | 90.2 | 85.0 | 85.4 | 58.9 | 56.4 | 64.4 | 56.2 |

The invention claimed is:

1. A composite material comprising:

a body comprising:

a plurality of inorganic particles;

a plurality of first resin particles comprising a first resin; and a second resin different from the first resin, wherein the first resin particles of the plurality of first resin particles have a hollow structure, the second resin is present around the plurality of first resin particles, at least a portion of the plurality of inorganic particles are in contact with the first resin particles of the plurality of first resin particles,

the inorganic particles of the plurality of inorganic particles are present on wall surfaces of the second resin facing the first resin particles, the composite material compressed by 10% has a reaction force of 0.1 kPa to 1000 kPa, and the composite material has a heat conductivity of 0.5 W/(m·K) or more, where the heat conductivity is a value measured for one test specimen in a symmetric configuration according to an American Society for Testing and Materials (ASTM) standard D5470-01.

2. The composite material according to claim 1, wherein a heat transmission path is formed of the plurality of inorganic particles in contact with each other.

3. The composite material according to claim 1, wherein a value $P_0$ determined by the following equation (1) is 30 or more:

$P_0$=(an average diameter [μm] of voids in the second resin within which the first resin particles of the plurality of first resin particles are accommodated/an average particle diameter [μm] of the inorganic particles) x (a void ratio [volume %]/100) Equation (1).

4. The composite material according to claim 1, having an Asker C hardness of 10 to 50.

5. The composite material according to claim 1, wherein the first resin particles of the plurality of first resin particles have substantially similar outer shapes.

6. The composite material according to claim 5, wherein the first resin particles of the plurality of first resin particles are substantially spherical.

7. The composite material according to claim 1, wherein the composite material is a non-foam body.

8. The composite material according to claim 1, wherein voids in the second resin within which the first resin particles of the plurality of first resin particles are accommodated have an average diameter of 50 μm to 5000 μm, and the inorganic particles have an average particle diameter of 0.1 μm to 50 μm.

9. The composite material according to claim 1, wherein the inorganic particles of the plurality of inorganic particles have an aspect ratio of 1 or more and less than 50.

10. The composite material according to claim 1, wherein the first resin particles of the plurality of first resin particles are accommodated within voids in the second resin, and the composite material has a void ratio of 10 volume % to 60 volume %.

11. A composite material comprising:

a body comprising:

a plurality of inorganic particles;

a plurality of first resin particles comprising a first resin; and a second resin different from the first resin, wherein the first resin particles of the plurality of first resin particles have a hollow structure, the second resin is present around the plurality of first resin particles, at least a portion of the plurality of inorganic particles are in contact with the first resin particles of the plurality of first resin particles, the inorganic particles of the plurality of inorganic particles are present on wall surfaces of the second resin facing the first resin particles, the composite material has a compressive elastic modulus of 100 kPa to 600 kPa, and the composite material has a heat conductivity of 0.5 W/(m·K) or more, where the heat conductivity is a value measured for one test specimen in a symmetric configuration according to an American Society for Testing and Materials (ASTM) standard D5470-01.

12. The composite material according to claim 11, wherein a heat transmission path is formed of the plurality of inorganic particles in contact with each other.

13. The composite material according to claim 11, wherein a value $P_0$ determined by the following equation (1) is 30 or more:

$P_0$=(an average diameter [μm] of voids in the second resin within which the first resin particles of the plurality of first resin particles are accommodated/an average particle diameter [μm] of the inorganic particles) x (a void ratio [volume %]/100) Equation (1).

14. The composite material according to claim 11, having an Asker C hardness of 10 to 50.

15. The composite material according to claim 11, wherein the first resin particles of the plurality of first resin particles have substantially similar outer shapes.

16. The composite material according to claim 11, wherein the composite material is a non-foam body.

17. The composite material according to claim 11, wherein voids in the second resin within which the first resin particles of the plurality of first resin particles are accommodated have an average diameter of 50 μm to 5000 μm, and the inorganic particles have an average particle diameter of 0.1 μm to 50 μm.

18. The composite material according to claim 11, wherein the inorganic particles of the plurality of inorganic particles have an aspect ratio of 1 or more and less than 50.

19. The composite material according to claim 11, wherein the first resin particles of the plurality of first resin particles are accommodated within voids in the second resin, and the composite material has a void ratio of 10 volume % to 60 volume %.

* * * * *